United States Patent
Okamoto et al.

(10) Patent No.: US 6,429,243 B1
(45) Date of Patent: Aug. 6, 2002

(54) POLYESTER RESIN COMPOSITION

(75) Inventors: Chihiro Okamoto, Kurashiki; Shunro Taniguchi, Saijo, both of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/719,174

(22) PCT Filed: Jun. 15, 1998

(86) PCT No.: PCT/JP98/02627
§ 371 (c)(1),
(2), (4) Date: Dec. 15, 2000

(87) PCT Pub. No.: WO99/65987
PCT Pub. Date: Dec. 23, 1999

(51) Int. Cl.[7] .............................. C08K 3/24; C08K 5/51; C08L 27/02; B32B 27/10; B65D 1/00
(52) U.S. Cl. ...................... 524/127; 524/398; 524/513; 523/505; 523/506; 428/34.2; 428/35.7; 428/481
(58) Field of Search ................................. 524/127, 398, 524/513; 523/505, 506; 428/34.2, 35.7, 481

(56) References Cited

U.S. PATENT DOCUMENTS 6,083,585 A * 7/2000 Cahill et al.

FOREIGN PATENT DOCUMENTS

| EP | 0 892 000 | 1/1999 |
|---|---|---|
| JP | 59-213756 | 12/1984 |
| JP | 60-4055 | 1/1985 |
| JP | 4-500387 | 1/1992 |
| JP | 7-323512 | 12/1995 |
| JP | 8-311313 | 11/1996 |
| JP | 9-255855 | 9/1997 |
| JP | 9-291203 | 11/1997 |
| JP | 10-17754 | 1/1998 |
| JP | 10-67924 | 3/1998 |
| WO | WO 97/38038 | 10/1997 |

\* cited by examiner

Primary Examiner—Tae H. Yoon
(74) Attorney, Agent, or Firm—Oblon, Spivak, McClelland, Maier & Neustadt, P.C.

(57) ABSTRACT

(A) A polyester resin composition comprising a copolymerized polyethylene terephthalate (copolymerized PET) comprising 5 to 40 mole % of naphthalenedicarboxylic acid units, a cobalt compound and/or a manganese compound, an olefin polymer and a compatibility-improving agent, in specific amounts; and (B) a polyester resin composition comprising the above copolymerized PET which contains specific amounts of both a cobalt compound and a manganese compound are excellent in resistance to hydrogen peroxide, flavor-barrier properties, gas-barrier properties, heatsealability and mechanical properties such as elongation and strength and, utilizing these features, are effectively usable for various end-uses in particular as packaging materials for beverages such as fruit juices containing flavor components.

32 Claims, No Drawings

US 6,429,243 B1

POLYESTER RESIN COMPOSITION

TECHNICAL FIELD

The present invention relates to polyester resin compositions, and films, packaging materials, laminates and containers comprising the compositions. More specifically, the present invention relates to polyester resin compositions having excellent heatsealability, resistance to hydrogen peroxide, flavor-barrier properties, gas-barrier properties and mechanical properties such as elongation and strength, and also to films and the like comprising such compositions. The polyester resin compositions, films and the like of the present invention can, utilizing the above features, effectively be used for various uses, in particular as packaging materials for containers for beverages containing flavor ingredients.

BACKGROUND ART

The problem of the disposal of plastic containers having once been used has become a big social issue. Demand has therefore increased for paper containers, which can be incinerated or regenerated relatively simply and smoothly compared to plastic containers. This trend also holds for containers for beverages such as juices, and thus paper containers covered, on their inner surface, with resin films are generally used widely for containers for juices and the like. In this case, olefin resins are generally used as the resin films covering the inner surface of the paper containers. However, such paper containers covered on their inner surface with olefin resins will, when used for beverages containing flavor components, such as fruit juices, sometimes cause loss of flavor, change in taste and like problems.

Japanese Patent Application Laid-open No. 133638/1991 proposes, to solve the problems, covering the inner surface of paper containers with, instead of olefin resins, a polyester resin laminate comprising a layer of a modified polyethylene terephthalate containing about 5 to 20 mole % of a copolymerization component. This improvement is, due to the gas-barrier properties and flavor-barrier properties inherently possessed by polyester resin, successful in keeping good, to some extent, the level of the flavor and taste of the beverages or the like packed in the paper containers.

However, the covering layer comprising the above modified polyester resin laminate has several drawbacks as follows. That is, the covering layer tends, on sterilization by hydrogen peroxide, which treatment is widely adopted in the production process of paper containers, to swell, produce bubbles in the covering layer and partly delaminate from the paper base. These troubles markedly deteriorate the processability and process-runnability on the production of paper containers. Besides, the hydrogen, peroxide contained in the thus swollen covering layer comprising the polyester resin laminate migrates to the contents packed in the paper containers, which may lead to decreases in the quality and safety of the food contained.

Japanese Patent Application Laid-open No. 45883/1998 proposes use of a modified polyethylene terephthalate copolymerized with naphthalenedicarboxylic acid, in which the content of remaining metals has been suppressed to 10 millimoles % or below and the content of a phosphorus compound has been adjusted to 3 to 20 millimoles %, to improve the transparency and color tone of the copolyester. In this case, however, the features inherent in polyethylene terephthalate, such as resistance to hydrogen peroxide, are not sufficiently improved.

Under the above situation, the present inventors have studied to develop a polyester resin composition which can effectively be used for food containers and the like. That is, the present inventors have studied in order to provide a polyester resin composition which maintains at a good level the gas-barrier properties and flavor-barrier properties inherently possessed by polyester resins, does not cause, on sterilization with hydrogen peroxide, swelling, bubble generation, delamination from the base and like troubles, has excellent heatsealability, thereby being able to be bonded and laminated firmly and smoothly on bases such as paper, and is excellent in mechanical properties such as elongation in handleability.

As a result, the present inventors have found that a polyester resin composition having excellent gas-barrier and flavor-barrier properties, resistance to hydrogen peroxide, heatsealability and mechanical properties can be obtained by melt kneading under specific conditions a copolyester resin having specific contents of naphthalenedicarboxylic acid component and/or a specific diol component, which co-polyester resin has been mixed with an olefin polymer and a compatibility-improving agent in specific amounts. Japanese Patent Application Laid-open No. 302204/1997 was filed based on the above finding.

DISCLOSURE OF THE INVENTION

Based on the invention disclosed in the above Japanese Patent Application Laid-open No. 302204/1997, the present inventors have made a further study to achieve a better improvement technology.

As a result, the present inventors have found that the polyester resin composition of the invention of the above Japanese Patent Application Laid-open No. 302204/1997 is, when a specific amount of at least one metal compound selected from the group consisting of manganese compounds and cobalt compounds is incorporated therein, more improved in its resistance to hydrogen peroxide, while maintaining its excellent gas-barrier and flavor-barrier properties, heatsealability and mechanical properties. The resulting composition becomes markedly useful as molded articles such as film, packaging material for foods and like uses.

The present inventors have further found that another polyester resin composition having excellent resistance to hydrogen peroxide, as well as excellent gas-barrier and flavor-barrier properties, heatsealability and mechanical properties can be obtained by incorporation of both a manganese compound and a cobalt compound into the same copolyester resin containing a specific amount of naphthalenedicarboxylic acid as that used in the invention of the above Japanese Patent Application Laid-open No. 302204/1997.

The present inventors have still further found that, with the above two types of polyester resin compositions, incorporation of a specific amount of an alkali metal salt of an organic carboxylic acid and/or a phosphorus compound leads to further improvement of the resistance to hydrogen peroxide, thermal resistance and resistance to coloring, and completed the present invention based on these findings.

Thus, the present invention provides a polyester resin composition (hereinafter sometimes referred to as "polyester resin composition (A)")

(i) which comprises:
(a) units from a diol consisting essentially of ethylene glycol units and units from a dicarboxylic acid consisting essentially of terephthalic acid, as essential components, and units from naphthalenedicarboxylic acid in an amount of 5 to 40 mole % based on the total moles of all structural units;

(b) at least one metal compound selected from the group consisting of cobalt compounds and manganese compounds;
(c) an olefin polymer; and
(d) a compatibility-improving agent;
(ii) said metal compound being contained in an amount based on the weight-of said polyester resin of 100 to 1,000 ppm and said olefin polymer and compatibility-improving agent being contained in such amounts as to satisfy the following formulas ① and ②:

$$10 \text{ (parts by weight)} \leq X+Y \leq 100 \text{ (parts by weight)} \qquad ①$$

$$1 \leq X/Y \leq 90 \qquad ②$$

wherein X and Y represent, respectively, the content of the olefin polymer (parts by weight) based on 100 parts by weight of the polyester resin and that of the compatibility-improving agent on the same basis; and
(iii) which has been obtained by melt kneading in such a manner as to satisfy the following formula ③

$$E/F \leq 1 \qquad ③$$

where $E = \eta_1 (X+Y)/(\eta_2 X + \eta_3 Y)$
$F = 100 D_2 D_3 / D_1 (D_3 X + D_2 Y)$
wherein X and Y are the same as defined for formulas ① and ②, $\eta_1$, $\eta_2$ and $\eta_3$ represent, respectively, the melt viscosities (in poises) of the polyester resin, olefin polymer and compatibility-improving agent determined at the melt kneading temperature on preparation of the polyester resin composition, and $D_1$, $D_2$ and $D_3$ represent, respectively, the densities at 25° C. of the polyester resin, olefin polymer and compatibility-improving agent.

The present invention further provides a polyester resin composition (hereinafter sometimes referred to as "polyester resin composition (B)")
(i) which comprises:
(a) units from a diol consisting essentially of ethylene glycol and units from a dicarboxylic acid consisting essentially of terephthalic acid, as essential components, and units from naphthalenedicarboxylic acid in an amount of 5 to 40 mole % based on the total moles of all structural units;
(b) a cobalt compound; and
(c) a manganese compound
(ii) said cobalt compound and manganese compound being contained in such amounts as to satisfy the following formulas ⑤ through ⑦:

$$0.01 \leq C_{Co} \leq 0.20 \qquad ⑤$$

$$0.01 \leq C_{Mn} \leq 0.20 \qquad ⑥$$

$$0.02 \leq (C_{Co} + C_{Mn}) \leq 0.30 \qquad ⑦$$

wherein $C_{Co}$ and $C_{Mn}$ represent, respectively, the mole % based on the total moles of all dicarboxylic acid units present in the polyester resin of the cobalt compound in terms of cobalt atom and that of manganese compound in terms of manganese atom.

The present invention also includes a polyester resin composition comprising the above polyester resin composition (A) or (B) and further comprising an alkali metal salt of an aliphatic carboxylic acid having 1 to 15 carbon atoms in an amount of 100 to 10,000 ppm in terms of the alkali metal atom based on the weight of the polyester resin contained in said composition.

The present invention further includes a polyester resin composition comprising the above polyester resin composition (A) and further comprising a phosphorus compound in such an amount as to satisfy the following formula ④

$$(C_P/C_M) \leq 0.65 \qquad ④$$

wherein $C_P$ and $C_M$ represent, respectively, the mole % based on the total moles of dicarboxylic acid units contained in the polyester resin of the phosphorus compound in terms of phosphorus atom and that of the metal compound in terms of the metal atom.

The present invention still further includes a polyester resin composition comprising the above polyester resin composition (B) and further comprising a phosphorus compound in such an amount as to satisfy the following formula ④

$$C_P/(C_{Co} + C_{Mn}) \leq 0.65 \qquad ④$$

wherein $C_P$, $C_{Co}$ and $C_{Mn}$ represent, respectively, the mole % based on the total moles of dicarboxylic acid units contained in the polyester resin of the phosphorus compound in terms of phosphorus atom, that of the cobalt compound in terms of cobalt atom and that of the manganese compound in terms of manganese atom.

The present invention yet further includes molded articles such as film and packaging materials comprising the above polyester resin compositions, laminates comprising a layer of the above polyester resin compositions and a paper layer, and paper containers covered on the inner surface thereof with the polyester resin compositions.

MODES FOR CARRYING OUT THE INVENTION

The polyester resin constituting the main component of the polyester resin compositions of the present invention consists essentially of units from a diol consisting essentially of ethylene glycol and units from a dicarboxylic acid consisting essentially of terephthalic acid and further comprises units from naphthalenedicarboxylic acid.

With the polyester resin used in the present invention, it is desirable, in order to provide the resulting polyester resin compositions with good gas-barrier properties and flavor-barrier properties, that the content based on the total moles of all structural units constituting the polyester resin of terephthalic acid units be 10 to 45 mole %, more preferably 15 to 42.5 mole %, and that the content of ethylene glycol units be 10 to 50 mole %, more preferably 20 to 50 mole % on the same basis.

With the polyester resin used in the present invention, it is necessary that naphthalenedicarboxylic acid units be contained in an amount, based on the total moles of all structural units constituting the polyester resin, of 5 to 40 mole %, more preferably 7.5 to 35 mole %. If the content of naphthalenedicarboxylic acid units in the polyester resin is less than 5 mole %, the resulting polyester resin compositions will have poor heatsealability and will, on sterilization with hydrogen peroxide, swell to a large extent. On the other hand, if the content of naphthalene-dicarboxylic acid units in the polyester resin exceeds 40 mole %, the resulting polyester resin composition will also have poor heatsealability.

The polyester resin used in the present invention may possess structural units other than those mentioned above, within limits not to impair the heatsealability, gas-barrier and flavor-barrier properties and like features. Examples of such other structural units are diol units derived from diols, e.g. diethylene glycol, butanediol, polyethylene glycols (preferably those having a molecular weight of 400 to 30,000) and 1,4-cyclohexanedimethanol; and dicarboxylic acid units derived from aromatic dicarboxylic acids, e.g. isophthalic acid and sodium sulfoisophthalate, aliphatic dicarboxylic acids, e.g. succinic acid, glutaric acid, adipic acid, pimelic acid, suberic acid and sebacic acid; and ester-forming derivatives of the foregoing. The polyester resin may contain one or at least two kinds of the above other structural units. In general, it is desirable that the content of the other structural units be not more than about 5 mole % based on the total moles of all structural units constituting the polyester resin.

It is also desirable in view of film formability and film strength, that the polyester resin used in the present invention have an intrinsic viscosity (determined in a 1/1 by weight mixed solvent of phenol/tetrachloroethane at 30° C.) of 0.60 to 1.50 dl/g.

The polyester resin composition (A) of the present invention contains at least one metal compound selected from the group consisting of cobalt compounds and manganese compounds. The polyester resin composition (A) may either contain a cobalt compound only or a manganese compound only; or, it may contain both a cobalt compound and a manganese compound.

On the other hand, it is necessary that the polyester resin composition (B) contain both of a cobalt compound and a manganese compound.

Examples of cobalt compounds usable for the polyester resin composition (A) and polyester resin composition (B) of the present invention (hereinafter these compositions are sometimes referred inclusively as "polyester resin compositions") are cobalt salts of aliphatic acids, e.g. cobalt formate, cobalt acetate and cobalt propionate; cobalt halides, e.g. cobalt chloride, cobalt bromide; cobalt iodide and cobalt fluoride; cobalt sulfate; cobalt sulfide, cobalt oxide and cobalt hydroxide.

Examples of manganese compounds usable for the polyester resin compositions of the present invention are manganese salts of aliphatic acids, e.g. manganese formate, manganese acetate and manganese propionate; manganese halides, e.g. manganese chloride, manganese bromide, manganese iodide and manganese fluoride; manganese sulfate; manganese sulfide; manganese oxide and manganese hydroxide.

The polyester resin composition (A) of the present invention can contain one or at least two kinds of the above cobalt compounds and manganese compounds.

The polyester resin composition (B) of the present invention can contain a combination of one or at least two kinds of the above cobalt compounds and one or at least two kinds of the above manganese compounds.

Among the above compounds, for the polyester resin compositions of the present invention, cobalt acetate and/or cobalt sulfate are preferably used as cobalt compound and manganese acetate and/or manganese sulfate are preferably used as manganese compound.

The polyester resin composition (A) contains at least one metal compound selected from the group consisting of cobalt compounds and manganese compounds, in an amount of 100 to 1000 ppm in terms of metal atom based on the weight of the polyester resin present in the polyester resin composition (A) (i.e. 0.01 to 0.1 part by weight in terms of metal atom based on 100 parts by weight of the polyester resin).

If the content of the above metal compound (cobalt compound and/or manganese compound) in the polyester resin composition (A) is less than the above-described 100 ppm, the composition will swell to a large extent on sterilization with hydrogen peroxide. On the other hand, if the content of the above metal compound (cobalt compound and/or manganese compound) in the polyester resin composition (A) exceeds the above-described 1000 ppm, the polyester resin will decompose on melt molding of the polyester resin composition (A), so that the strength of the obtained molded articles such as film will decrease. In view of more effective suppression of swelling on sterilization with hydrogen peroxide and of decomposition of the polyester resin on melt molding, the content of the metal compound is preferably 150 to 800 ppm in terms of metal atom based on the weight of the polyester resin.

It is necessary that the polyester resin composition (B) contain both a cobalt compound and a manganese compound in such amounts as to satisfy the following formulas ⑤ through ⑦:

$$0.01 \leq C_{Co} \leq 0.20 \quad ⑤$$

$$0.01 \leq C_{Mn} \leq 0.20 \quad ⑥$$

$$0.02 \leq (C_{Co} + C_{Mn}) \leq 0.30 \quad ⑦$$

wherein $C_{Co}$ and $C_{Mn}$ represent, respectively, the mole % based on the total moles of all dicarboxylic acid units present in the polyester resin of the cobalt compound in terms of cobalt atom and that of manganese compound in terms of manganese atom.

If, in the polyester resin composition (B), the content, based on the total moles of all dicarboxylic acid units of the polyester resin, of the cobalt compound is less than 0.01 mole % in terms of cobalt atom, that of the manganese compound is less than 0.01 mole % in terms of manganese atom, or that of the cobalt compound and manganese compound in terms of the sum of cobalt atom and manganese atom is less than 0.02 mole %, the composition will swell to a large extent on sterilization with hydrogen peroxide. On the other hand, if the content, based on the total moles of all dicarboxylic acid units of the polyester resin, of the cobalt compound in the polyester resin composition (B) exceeds 0.20 mole % in terms of cobalt atom, that of the manganese compound exceeds 0.20 mole % in terms of manganese atom, or that of the cobalt compound and manganese compound exceeds 0.30 mole % in terms of the sum of cobalt atom and manganese atom, the polyester resin will decompose on melt molding of the polyester resin composition (B), so that the strength of the obtained molded articles such as film will decrease.

With the polyester resin composition (B), in view of better resistance of the composition to hydrogen peroxide and that of the polyester resin to thermal decomposition, the above content ($C_{Co}$) of the cobalt compound is preferably in a range of 0.02 to 0.15 mole %, that ($C_{Mn}$) of the manganese compound is preferably in a range of 0.02 to 0.15 mole % and the total content ($C_{Co}+C_{Mn}$) of the cobalt compound and manganese compound is preferably in a range of 0.04 to 0.20 mole %.

With the polyester resin composition (B), incorporation of a cobalt compound and a manganese compound in amounts satisfying the above formulas ⑤ through ⑦ into the above polyester resin containing naphthalenedicarboxylic units in the above specific amount insures excellent heatsealability, resistance to hydrogen peroxide, flavor-barrier properties, gas-barrier properties and mechanical properties such as elongation and strength.

The polyester resin composition (A) of the present invention comprises, in addition to the above cobalt compound and/or manganese compound, a third component of an olefin polymer. Ethylene polymers are preferably used as the olefin polymer, in view of heatsealability, suppression of swelling on sterilization with hydrogen peroxide and the strength and elongation of the resultant films. Examples of ethylene polymers preferably usable are high density polyethylene, low density polyethylene, linear low density polyethylene and ethylene-vinyl acetate copolymer. Among these, high density polyethylene, which can suppress film breakage on film formation, is more preferably used. It is preferred, although not necessarily limited thereto, that the olefin polymer used for the polyester resin composition (A) have a melt flow rate (MFR) of about 1 to 3 g/10 minutes, in view of suppression of neck-in trouble on film formation.

The polyester resin composition (A) of the present invention comprises a fourth component of a compatibility-improving agent. The compatibility-improving agent is, for the polyester resin composition (A), used in order to disperse finely a dispersed phase comprising the olefin polymer used, in the polyester resin forming a matrix phase and, at the same time, to increase the interfacial adhesiveness between the polyester resin phase and the olefin polymer phase.

Preferably usable as the compatibility-improving agent are polymers possessing in the molecule thereof both a structural part having affinity to the polyester resin and another structural part having affinity to the olefin polymer used. Preferred examples of such polymers are block copolymers and graft copolymers possessing a polymeric part having affinity to the polyester resin and another polymeric part having affinity to the olefin polymer; and polymers having affinity to the olefin polymer and containing in the molecule thereof groups reactable with the terminal hydroxyl group and/or terminal carboxyl group of the polyester resin.

Examples of particularly preferred compatibility-improving agents among the above are the following polymers: (1) ethylene/(meth)acrylic acid copolymers, (2) ethylene/(meth)acrylic acid copolymers crosslinked with metal ion (ionomers), (3) block copolymers comprising blocks of styrene/ethylene/butadiene copolymer having carboxyl groups or derivatives thereof and blocks of styrene polymer, and (4) block copolymers comprising blocks of an olefin polymer having carboxyl groups or derivatives thereof and blocks of styrene polymer. The polyester resin composition (A) of the present invention may contain only one or at least two kinds of these polymer-based compatibility-improving agents.

Ethylene/acrylic acid copolymer is preferred of the (1) ethylene/(meth) acrylic acid copolymers mentioned above as compatibility-improving agent. With this copolymer, the copolymerization ratio of acrylic acid is more preferably 4 to 15% by weight, which leads to better mechanical properties of the resulting polyester resin composition (A) and films and the like obtained therefrom. If the copolymerization ratio of acrylic acid is less than 4% by weight, sufficient affinity to the polyester resin phase will not be exhibited and the resulting polyester resin composition (A) and films and the like formed therefrom will tend to have poor mechanical properties. On the other hand, if the copolymerization ratio of acrylic acid in the ethylene/acrylic acid copolymer exceeds 15% by weight, gels will sometimes be generated in the resulting polyester resin composition (A).

Ethylene/methacrylic acid copolymer crosslinked with metal ion is preferably used of the (2) ethylene/(meth)-acrylic acid copolymer crosslinked with metal ion (ionomers) mentioned above as the compatibility-improving agent. With this ionomer, the copolymerization ratio of methacrylic acid is preferably 5 to 15% by weight, in view of the mechanical properties of the resulting polyester resin composition (A) and films and the like obtained therefrom and of suppression of gel generation.

The block copolymers (3) and (4) having carboxyl group or derivatives thereof mentioned above as the compatibility-improving agent comprise block copolymers comprising styrene/ethylene/butadiene copolymer blocks and styrene polymer blocks or block copolymers comprising olefin polymer blocks and styrene polymer blocks, both modified with a carboxylic acid such as maleic anhydride, maleic acid, fumaric acid, itaconic acid, acrylic acid, crotonic acid or maleic imide, or derivatives thereof. Among these, the above block copolymers modified with maleic anhydride are preferably used. In this case, the amount of modification with maleic anhydride in the block copolymers is preferably 0.5 to 3% by weight based on the total weight of the block copolymers, in view of the mechanical properties and suppression of gel generation of the resulting polyester resin compositions (A) and films obtained therefrom.

The polymer-based compatibility-improving agent used for the polyester resin composition (A) desirably has a melt flow rate (MFR) of about 1 to 7 g/10 min, in view of film strength.

The polyester resin composition (A) of the present invention comprises the above polyester resin, olefin polymer and compatibility-improving agent in such amounts as to satisfy the following formulas ① and ②:

$$10 \text{ (parts by weight)} \leq X+Y \leq 100 \text{ (parts by weight)} \quad ①$$

$$1 \leq X/Y \leq 90 \quad ②$$

wherein X and Y represent, respectively, the content of the olefin polymer (parts by weight) based on 100 parts by weight of the polyester resin and that of the compatibility-improving agent on the same basis.

If, in the polyester resin composition (A), the total content (X+Y) of the olefin polymer and compatibility-improving agent is less than 10 parts by weight based on 100 parts by weight of the polyester resin, thus deviating from the above formula ①, the resulting polyester resin composition (A) and films and the like comprising the same will, when exposed to hydrogen peroxide, absorb the hydrogen peroxide, which leads to swelling, bubble generation, delamination from the base such as paper and like troubles. On the other hand, if the total content (X+Y) of the olefin polymer and compatibility-improving agent in the polyester resin composition (A) exceeds 100 parts by weight based on 100 parts by weight of the polyester resin, thus also deviating from the above formula ①, the gas-barrier properties and flavor-barrier properties of the resulting polyester resin composition (A) and films and the like comprising the same will be impaired. With the polyester resin composition (A) of the present invention, the total content of the olefin polymer and compatibility-improving agent is preferably 20 to 70 parts by weight based on 100 parts by weight of the polyester resin, which insures better resistance to, hydrogen peroxide, thereby being capable of effectively preventing swelling, bubble generation and delamination from the base, and better gas-barrier properties and flavor-barrier properties.

If the ratio (X/Y) between the content of the olefin polymer in the polyester resin composition (A) and that of the compatibility-improving agent is less than 1, thus deviating from the above formula ②, the content of the compatibility-improving agent in the polyester resin composition (A) will become too high, so that gels will be generated. On the other hand, if the ratio (X/Y) between the content of the olefin polymer in the polyester resin composition (A) and that of the compatibility-improving agent exceeds 90, thus deviating from the above formula ②, the content of the compatibility-improving agent in the polyester resin composition (A) will become too low to achieve good compatibility between the polyester resin phase and the olefin polymer phase, so that the physical properties for example mechanical properties such as strength and elongation of the resulting polyester resin composition (A) and films and the like obtained therefrom are impaired. The above ratio (X/Y) in the polyester resin composition (A) of the present invention is preferably in a range of 1 to 40.

It is necessary that the polyester resin composition (A) of the present invention have, besides satisfying the above requirements, been obtained by melt kneading in such a manner as to satisfy the following formula ③

$$E/F \leq 1 \qquad \qquad ③$$

where $E = \eta_1(X+Y)/(\eta_2 X + \eta_3 Y)$ $F = 100 D_2 D_3 / D_1 (D_3 X + D_2 Y)$ wherein X and Y are the same as defined for formulas ① and ②, $\eta_1$, $\eta_2$ and $\eta_3$ represent, respectively, the melt viscosities (in poises) of the polyester resin, olefin polymer and compatibility-improving agent determined at the melt kneading temperature on preparation of the polyester resin composition, and $D_1$, $D_2$ and $D_3$ represent, respectively, the densities at 25° C. of the polyester resin, olefin polymer and compatibility-improving agent.

To this end, it becomes necessary to make appropriate the amounts to be mixed of the polyester resin, olefin polymer and compatibility-improving agent to be used, the selection of the above three components having appropriate densities, the selection of the above three components capable of exhibiting the viscosities at the melt kneading temperature actually adopted satisfying the formula ③, and the selection of melt kneading temperature and like conditions for preparing the polyester resin composition (A). Taking the above points into consideration, by selecting appropriate polymers and employing suitable melt kneading conditions, one can obtain the polyester resin composition (A) of the present invention that satisfies the above formula ③.

Polyester resin compositions and films and the like obtained therefrom, with the value of E/F exceeding 1 and not satisfying formula ③, have poor flavor-barrier properties even if such polyester resin compositions have been prepared by melt kneading. The reason for this is, being not clear though, estimated to be as follows. That is, with the value of E/F exceeding 1, the polyester resin does not form a matrix in the obtained polyester resin composition, while the olefin polymer and/or compatibility-improving agent does, so that the good gas-barrier properties inherently possessed by the polyester resin cannot be exhibited.

Although a smaller value of the above ratio E/F results in easier matrix formation of the polyester resin in the polyester resin composition, too small a value of E/F tends to cause problems such as decrease in resistance to hydrogen peroxide. With the polyester resin composition (A), the value of E/F is preferably 0.1 to 0.9.

The polyester resin composition (A) of the present invention, which comprises, together with a cobalt compound and/or a manganese compound, an olefin polymer and a compatibility-improving agent in such amounts as to satisfy the above formulas ① and ②, and also satisfy the above formula ③ is excellent in heatsealability, resistance to hydrogen peroxide, flavor-barrier properties, gas-barrier properties and mechanical properties such as elongation and strength, as well as in flexibility and folding processability.

The polyester resin composition (A) and polyester resin composition (B) of the present invention can comprise in addition to the above-described components, an alkali metal salt of an aliphatic carboxylic acid having 1 to 15 carbon atoms. Then, the compositions are provided with still better resistance to hydrogen peroxide and can more effectively suppress swelling on sterilization with hydrogen peroxide. Examples of usable alkali metal salts of aliphatic carboxylic acids having 1 to 15 carbon atoms are sodium formate, sodium acetate, potassium acetate, sodium propionate, potassium propionate, sodium butyrate, potassium butyrate, sodium valerate, potassium valerate, sodium caproate, potassium caproate, sodium caprate, potassium caprate, sodium laurate, potassium laurate, sodium myristate and potassium myristate. The salts may be used either singly or in combination of two or more.

The content of the above alkali salt of an aliphatic carboxylic acid in the polyester resin composition (A) and/or polyester resin composition (B) is preferably 100 to 10,000 ppm in terms of the alkali metal atom based on the weight of the polyester resin present in the polyester resin composition (0.01 to 1 part by weight based on 100 parts by weight of the polyester resin), more preferably 1,500 to 8,000 ppm on the same basis.

The polyester resin used for the polyester resin compositions of the present invention can be produced, with no specific restrictions, by any process generally adopted for general-purpose polyester resins such as polyethylene terephthalate. For example, one can use a polyester resin-forming material comprising a dicarboxylic acid component comprising a dicarboxylic acid consisting essentially of terephthalic acid or lower alkyl esters thereof and a diol component consisting essentially of ethylene glycol, which material further comprises naphthalenedicarboxylic acid or ester-forming derivatives thereof in such an amount as to permit the copolymerization ratio of naphthalenedicarboxylic acid units in the resulting polyester to fall into the above range of 5 to 40 mole %. This material is subjected to esterification or transesterification to form a low-molecular-weight polymer, which is then melt polycondensed into a polyester. The obtained polyester is formed into chips, pellets or the like having any optional shape, which are as desired further subjected to solid-phase polymerization to yield the desired polyester resin.

A preferable process, though not limited thereto, for producing the polyester resin is now more concretely described. It is recommended, on producing the above low-molecular-weight polymer by esterification, to subject the above polyester resin-forming material to esterification at a temperature of about 230 to 280° C. under atmospheric pressure or under an absolute pressure of not higher than 3 kg/cm². On this occasion, it is desirable to use the dicarboxylic acid component and the diol component in a molar ratio of 1:1 to 1:1.5.

Where transesterification is employed to produce the low-molecular-weight polymer, it is recommended to subject the above polyester resin-forming material at about 170 to 230° C. under atmospheric pressure or under a pressure close to atmospheric pressure. On this occasion, it is desirable to use the dicarboxylic acid component and the diol component in a molar ratio of 1:1 to 1:3. Examples of catalysts usable for the transesterification are metal compounds similar to the manganese compound or cobalt compound contained in the polyester resin compositions of the present invention, and titanic acid esters, which have been widely used, such as tetraisopropyl titanate, tetrabutyl titanate and tetrastearyl titanate.

The above melt polycondensation for producing the polyester resin from a low-molecular-weight polymer can be carried out, generally, in the presence of a polycondensation catalyst such as germanium dioxide or antimony trioxide, at a temperature of about 260 to 290° C. In conducting this polycondensation, it is desirable to use germamium dioxide in an amount of 50 to 300 ppm, which can suppress swelling on treatment with hydrogen peroxide.

The melt polycondensation yields, generally, a, polyester having an intrinsic viscosity of 0.50 to 1.50 dl/g.

It is also desirable to conduct the above melt polycondensation with addition of a phosphorus compound, e.g. phosphoric acid, phosphorous acid, trimethyl phosphate, triethyl phosphate, tributyl phosphate, trioctyl phosphate and triphenyl phosphate, which can prevent the resulting polyester from coloring by thermal decomposition and from decrease in molecular weight on melt molding.

Too much content of a phosphorus compound in the polyester resin and in the polyester resin composition will, however, decrease the resistance to hydrogen peroxide of the polyester resin composition, since the phosphorus compound deactivates the cobalt compound or manganese compound used.

It is therefore recommended, with the polyester resin composition (A), to adjust the amount of the phosphorous compound to be added on melt polycondensation such that its content in the composition satisfies the following formula (4)

$$(C_P/C_M) \leq 0.65 \quad (4)$$

wherein $C_P$ and $C_M$ represent, respectively, the mole % based on the total moles of dicarboxylic acid units contained in the polyester resin of the phosphorus compound in terms of phosphorus atom and that of the metal compound (cobalt compound and/or manganese compound) in terms of the metal atom.

With the polyester resin composition (B), it is recommended to adjust the amount of the phosphorous compound to be added on melt polycondensation such that its content in the composition satisfies the following formula (4)

$$C_P/(C_{Co}+C_{Mn}) \leq 0.65 \quad (4)$$

wherein $C_P$, $C_{Co}$ and $C_{Mn}$ represent, respectively, the mole % based on the total moles of dicarboxylic acid units contained in the polyester resin of the phosphorus compound in terms of phosphorus atom, that of the cobalt compound in terms of cobalt atom and that of the manganese compound in terms of manganese atom.

The above esterification, transesterification and polycondensation may as necessary be conducted with addition of a diethylene glycol byproduction-suppressing agent, such as tetraammonium hydroxide, triethanolamine or triethylamine.

The polyester obtained by the above melt polycondensation is generally formed into chips or pellets, which are, as desired, preliminarily crystallized at a temperature of 190° C. or below and can then be subjected to solid phase polymerization. The solid phase polymerization is, desirably, conducted by heating the chips (pellets) at about 190 to 240° C. under reduced pressure or in stream of an inert gas such as nitrogen, while chips (pellets) are fluidized to prevent sticking by fusion. In view of the mechanical properties and viscosity on melt molding of the resulting polyester resin, it is recommended to continue the solid phase polymerization up to a stage where the finally obtained polyester resin has an intrinsic viscosity (determined at 30° C. in a 1/1 by weight mixed solvent of phenol/tetrachloroethane) in a range of about 0.60 to 1.50 dl/g.

By carrying out the above series of processes, the polyester which is preferably used for the polyester resin compositions of the present invention is obtained.

The polyester resin compositions of the present invention may, within limits not to impair the purpose of the invention, incorporate various known additives, e.g. hydrolysis-preventing agent, color, flame retardant, antioxidant, UV absorber, antistatic agent and lubricant. Where, however, the polyester resin compositions of the present invention are used at places directly touching foods, as is the case with covering material for the inner surface of paper containers for foods, it becomes necessary to take safety problems sufficiently into consideration on selecting the type of the additives used.

In producing the polyester resin composition (A) of the present invention, it is necessary to melt knead the above components under such conditions as to satisfy the above formula (3), in order to permit the polyester resin phase to form, in the resultant polyester resin composition, a matrix, in which the olefin polymer phase is dispersed uniformly and finely by the compatibility-improving action exhibited by the compatibility-improving agent used.

For the melt kneading, one may select a process which comprises at first producing the polyester resin in a polymerization vessel and then, after addition of an olefin polymer and a compatibility-improving agent into the vessel, conducting melt kneading. It is however recommended, in view of productivity and homogeneous mixing, to use an extruder or like melt kneaders. When such a melt kneader is used, the melt kneading temperature is preferably about 220 to 300° C., more preferably 240 to 280° C., which insures production of the polyester resin compositions having good physical properties. If the melt kneading temperature employed on production of the polyester resin composition (A) is lower than 220° C., the functional groups present in the compatibility-improving agent will not sufficiently react with the terminal hydroxyl groups or carboxyl groups of the polyester resin, so that it becomes difficult to provide the resulting polyester resin composition or films and the like obtained therefrom with good physical properties. On the other hand, if the temperature exceeds 300° C., the polymer will undergo thermal decomposition markedly, thereby yielding a polyester resin composition as well as films obtained therefrom which tends to have poor physical properties.

With the polyester resin composition (A), there are no specific restrictions with respect to the processes for adding at least one metal compound selected from the group consisting of cobalt compounds and manganese compounds and for adding the above alkali metal salt of an organic carboxylic acid and phosphorus compound which may be used as occasions demand. The addition may thus be done at any time before, during or after melt kneading of the polyester resin, olefin polymer and compatibility-improving agent. Also, on transesterification or esterification to produce the polyester resin, a cobalt compound and/or manganese compound, as well as, as occasions demand, an alkali metal salt of an organic carboxylic acid and/or a phosphorous compound may be added as catalyst components or additives in specific amount to the reaction mixture, to produce the polyester resin composition (A) containing the cobalt compound and/or manganese compound and, as occasions demand, the alkali metal salt and/or the phosphorous compound.

With the polyester resin composition (B), there are no specific restrictions with respect to the process for adding a cobalt compound and manganese compound, either. Thus, the cobalt compound and manganese compound, as well as the above alkali metal salt of an organic carboxylic acid and phosphorus compound which may be used as occasions demand, can be added during or after the production of the polyester resin, to produce the polyester resin composition (B).

The polyester resin compositions of the present invention may have any shape with no specific limitation, but it is desirable to shape them into pellets or chips, which are conveniently usable for various molding processes.

The polyester resin compositions of the present invention can be heat-melt molded into various shaped articles, e.g. films, sheets, plates, pipes, hollow products, die-shaped articles and laminates. To shape these items, any process usable for molding thermoplastic resins in general can be used. Examples of the process are extrusion, casting, extrusion blow molding, injection molding, injection blow molding, calendering, pressing, thermoforming and various lamination molding.

The polyester resin compositions of the present invention are effectively usable when, in particular, shaped into packaging films and sheets, bottles and like shaped packaging containers, which products utilize the excellent features of the composition, including gas-barrier properties, flavor-barrier properties, heatsealability, resistance to hydrogen peroxide and mechanical properties. Especially, the compositions are suitable as films, sheets, containers and similar packaging materials for foods. Where the polyester resin compositions of the present invention are shaped into films or sheets, the thickness of these items may be appropriately set, with no specific limitation, depending on use. It is however generally recommended to make them about 0.005 to 1 mm thick.

For producing films or sheets from the polyester resin compositions of the present invention, any known process for producing films or sheets from thermoplastic resins can be used. Examples of usable processes are extrusion through T-die; tubular film extrusion which comprises extruding through a circular die, while introducing a fluid into the extruded hollow cylinder; casting; calendering and pressing. Of these processes, in order to produce films in large-scale commercial production, it is preferred to use extrusion, in particular tubular film extrusion, which insures ready molding, Less waste and low production cost. On production of films by tubular film extrusion, oriented films can, as necessary, be obtained at the same time with the extrusion, by adjusting the pressure and flow rate of the fluid introduced into the hollow cylindrical article extruded through the circular die, and the take-up speed of the extruded film.

The films or sheets comprising the polyester resin compositions of the present invention may be formed into 2-layer or at least 3-layer laminates with other base materials. Examples of the other base materials to be used on this occasion are thermoplastic polymers, e.g. polyolefins such as polyethylene and polypropylene, polyamides, polyvinyl chloride, polyvinylidene chloride, polyesters other than the above and ethylene-vinyl alcohol copolymer; paper; fabrics; and metal foils. These base materials may be used singly or in combination of 2 or more. These laminates may be produced by any known process with no particular limitation, such as extrusion lamination, dry lamination, wet lamination or hot-melt lamination.

In particular, laminates comprising paper and, laminated thereon, a film comprising any one of the polyester resin compositions of the present invention can effectively be used as materials for paper containers for fruit juices and similar beverages. Paper containers having on the inner surface thereof a film layer comprising any one of the polyester resin composition of the present invention have the following features. On sterilization with hydrogen peroxide, these containers do not swell, generate bubbles in the polyester resin composition layer or cause delamination between the polyester resin layer and the paper base. Moreover, these containers can maintain safely and at good levels the flavor and taste of the beverage packed therein, over a long period of time.

EXAMPLES

Hereinbelow, the present invention is concretely described with reference to Examples and Comparative Examples, which are by no means limitative of the invention. In the Examples and Comparative Examples that follow, the intrinsic viscosity of polyester resins, the melt viscosity of each polymer and the swellability with hydrogen peroxide, gas-barrier properties, heatsealability and elongation of films obtained from polyester resin compositions were determined or evaluated as follows.

(1) Intrinsic Viscosity of Polyester Resin

Determined in a 1/1 by weight mixed solvent of phenol/tetrachloroethane at 30° C. with an Ubbellohde viscometer (HRK-3, made by Hayashi Seisakusho Co.).

(2) Melt Viscosity of Each Polymer

A polymer sample was melted by heating at 280° C. and the melt was tested with a tester (CAPILLOGRAPH 1C, made by Toyo Seiki Co.)

(3) Swellability With Hydrogen Peroxide of Film

A sample of each of the polyester resin compositions in the following Examples and Comparative Examples was pressed at a temperature of 280° C. under a pressure of 100 kg/cm$^2$ into a film having a thickness of 100 $\mu$m. The film was cut into specimens of 100 mm×100 mm. The specimens were immersed in a 35% aqueous hydrogen peroxide solution at a temperature of 75° C. or 90° C. for 60 seconds. The specimens were then immersed in 400 ml of distilled water at a temperature of 25° C. for 1 hour. The concentration of the hydrogen peroxide having dissolved out into the distilled water was measured with a test paper, and taken as an index of swellability with hydrogen peroxide.

(4) Flavor-Barrier Properties of Film

A sample of each of the polyester resin compositions in the following Examples and Comparative Examples was pressed at a temperature of 280° C. under a pressure of 100 kg/cm$^2$ into a film having a thickness of 500 $\mu$m. The film was cut into a specimen of 20 mm×50 mm. The specimen was immersed in 50 ml of an orange juice (POM STRAIGHT JUICE) at a temperature of 25° C. for 12 days. After the specimen had been taken out from the orange juice, the juice was quantitatively tested by bromination titration for limonene remaining therein. The obtained value was taken as an index of flavor-barrier properties.

(5) Heatsealability of Film

A sample of each of the polyester resin compositions in the following Examples and Comparative Examples was pressed at a temperature of 280° C. under a pressure of 100 kg/cm$^2$ into a film having a thickness of 100 $\mu$m. The film was cut into 2 specimens of 50 mm×50 mm. The specimens were heatsealed with a heatsealer (YSS HEATSEALER, made by Yasuda Seiki Seisakusho Co.) under the conditions of a sealing pressure of 1.2 kg/cm$^2$ and a sealing time of 1.4 seconds. The lowest temperature at which the heatsealing was possible was taken as an index of heatsealability.

(6) Elongation of Film

A sample of each of the polyester resin compositions in the following Examples and Comparative Examples was pressed at a temperature of 280° C. under a pressure of 100 kg/cm² into a film having a thickness of 100 μm. The film was cut into specimens of 80 mm×15 mm. The specimens were tested for elongation in accordance with ASTM D882.

Example 1

(1) A slurry was prepared from 62.3 parts by weight of ethylene glycol, 44.3 parts by weight of dimethyl terephthalate and 55.7 parts by weight of dimethyl 2,6-naphthalanedicarboxylate (diol component:dicarboxylic acid component=2.25:1 in moles). The slurry was, in the presence of 807 ppm of cobalt (II) acetate tetrahydrate (transesterification catalyst; 191 ppm in terms of cobalt atom), subjected to transesterification by gradually heating from 170° C. up to 220° C. over 2 hours and 30 minutes, to yield a low-molecular-weight polymer composition containing cobalt (II) acetate tetrahydrate. The obtained low-molecular-weight polymer composition was then, in the presence of 200 ppm of a catalyst of germanium dioxide, melt polycondensed at a temperature of 280° C. under a reduced pressure of 1 torr (absolute pressure), to yield a polyester resin having an intrinsic viscosity of 0.75 dl/g. The polyester resin thus obtained was extruded through a nozzle into strands, which were then cut into cylindrical chips.

The polyester resin was tested for melt viscosity ($\eta_1$) at 280° C. and density (D,) at 25° C. The results are shown in Table 1 below.

(2) Separately from the above (1) , there were fed to a twin-screw extruder ($\phi$=30 mm; TEX30SS CRW-2V; made by The Japan Steel Works, Ltd.) 45 parts by weight of a high density polyethylene (NIPORON HARD 5700; made by Tosoh Corporation; melt flow rate 1.0 g/10 min) and 5 parts by weight of an ethylene/acrylic acid copolymer (NOVATEC EAA A201K; made by Mitsubishi Chemical Corporation; melt flow rate: 5.0 g/10 min; content of acrylic acid: 7.0% by weight). These polymers were melt kneaded at 200° C. and extruded into strands, which were then cut to give blend chips comprising both of the polymers.

The high density polyethylene and ethylene/acrylic acid copolymer used were tested for melt viscosities ($\eta_2$) and ($\eta_3$) at 280° C. and densities ($D_2$) and ($D_3$) at 25° C., respectively. The results are shown in Table 1 below.

(3) To a twin-screw extruder ($\phi$=30 mm) similar to that used in the above (2), 100 parts by weight of the polyester resin chips obtained in the above (1) and 50 parts by weight of the blend chips obtained in the above (2) were fed. These two types of chips were mixed by melt kneading at 280° C. and extruded and cut, to yield chips of a polyester resin composition comprising the copolymerized polyethylene terephthalate having naphthalenedicarboxylic acid units, cobalt (II) acetate tetrahydrate, high density polyethylene and ethylene/acrylic acid copolymer.

(4) The chips obtained in the above (3) were heated and dried at 90° C. for 16 hours and then pressed into films having a thickness of 100 μm and 500 μm in accordance with the above described methods. These films were tested or evaluated by the above methods for the swellability with hydrogen peroxide, flavor-barrier properties, heatsealability and elongation. The results are shown in Table 1 below.

Example 2

(1) A slurry was prepared from 68.3 parts by weight of ethylene glycol, 71.3 parts by weight of dimethyl terephthalate, 29.8 parts by weight of dimethyl 2,6-naphthalanedicarboxylate and 2,000 ppm of sodium acetate (560 ppm in terms of sodium atom) (diol component:dicarboxylic acid dimethyl ester=2.25:1 in moles). The slurry was, in the presence of 1151 ppm of manganese (II) acetate tetrahydrate (transesterification catalyst; 258 ppm in terms of manganese atom), subjected to transesterification by gradually heating from 170° C. up to 220° C. over 2 hours and 30 minutes, to yield a low-molecular-weight polymer composition containing manganese (II) acetate tetrahydrate. The obtained low-molecular-weight polymer composition was then, in the presence of 200 ppm of a catalyst of germanium dioxide, melt polycondensed at a temperature of 280° C. under a reduced pressure of 1 torr (absolute pressure), to yield a polyester resin having an intrinsic viscosity of 0.68 dl/g. The polyester resin thus obtained was extruded through a nozzle into strands, which were then cut into cylindrical chips. The polyester resin was tested for melt viscosity ($\eta_1$) at 280° C. and density ($D_1$) at 25° C. The results are shown in Table 1 below.

(2) Separately from the above (1), there were fed to the same twin-screw extruder as that used in (2) of Example 1, 32 parts by weight of a low density polyethylene (MIRASON F 9673P; made by Mitsui Chemicals Inc.; melt flow rate 1.1 g/10 min) and 8 parts by weight of a block copolymer comprising blocks of styrene/ethylene/butadiene copolymer modified with maleic anhydride and styrene blocks (TUFTEC M1913; made by Asahi Chemical Industry Co., Ltd.; melt flow rate: 1.0 g/10 min). These polymers were melt kneaded at 200° C. and extruded into strands, which were then cut to give blend chips comprising both of the polymers.

The low density polyethylene and block copolymer used were tested for melt viscosities ($\eta_2$) and ($\eta_3$) at 280° C. and densities ($D_2$) and ($D_3$) at 25° C., respectively. The results are shown in Table 1 below.

(3) To the same twin-screw extruder ($\phi$=30 mm) as that used in the above (2), 100 parts by weight of the polyester resin chips obtained in the above (1) and 40 parts by weight of the blend chips obtained in the above (2) were fed. These two types of chips were mixed by melt kneading at 280° C. and extruded and cut, to yield chips of a polyester resin composition comprising the copolymerized polyethylene terephthalate having naphthalenedicarboxylic acid units, manganese (II) acetate tetrahydrate, low density polyethylene, block copolymer comprising blocks of styrene/ethylene/butadiene copolymer modified with maleic anhydride and styrene blocks, and sodium acetate.

(4) The chips obtained in the above (3) were heated and dried at 90° C. for 16 hours and then formed into-films for test in the same manner as in (4) of Example 1. These films were tested or evaluated for the properties in the same manner as in (4) of Example 1. The results are shown in Table 1 below.

Example 3

(1) A slurry was prepared from 61.5 parts by weight of ethylene glycol, 25.7 parts by weight of dimethyl terephthalate, 75.3 parts by weight of dimethyl 2,6-naphthalanedicarboxylate and 3,000 ppm of sodium acetate (841 ppm in terms of sodium atom) (diol component:dicarboxylic acid component=2.25:1 in moles). The slurry was, in the presence of 524 ppm of cobalt acetate-4H₂O salt (124 ppm in terms of cobalt atom) and 633 ppm of manganese acetate-4H₂O salt (142 ppm in terms of manganese atom), subjected to transesterification by gradually heating from 170° C. up to 220° C. over 2 hours and 30 minutes, to yield a low-molecular-weight polymer composition containing cobalt acetate-4H$_2$O salt, manganese acetate-4H$_2$O salt and sodium acetate. The low-molecular-weight polymer composition was then, in the presence of 200 ppm of germanium dioxide and 132 ppm of trimethyl phosphate (29 ppm in terms of phosphorus atom) melt polycondensed at a temperature of 280° C. under a reduced pressure of 1 torr (absolute pressure), to yield a polyester resin having an intrinsic viscosity of 0.55 dl/g. The polyester resin thus obtained was extruded through a nozzle into strands, which were then cut into cylindrical chips. The polyester resin was tested for melt viscosity ($\eta_1$) at 280° C. and density ($D_1$) at 25° C. The results are shown in Table 1 below.

(2) Separately from the above (1), there were fed to the same twin-screw extruder as used in (2) of Example 1, 50 parts by weight of a linear low density polyethylene (IDEMITSU POLY-L0134N; made by Idemitsu Petrochemical Co., Ltd.; melt flow rate 1.0 g/10 min) and 10 parts by weight of an ionomer (ethylene/methacrylic acid copolymer crosslinked with metal ion; HIMILAN 1705; made by du Pont-Mitsui Polychemical Co., Ltd.; melt flow rate: 5.0 g/10 min). These polymers were melt kneaded at 200° C. and extruded into strands, which were then cut to give blend chips comprising both of the polymers. The linear low density polyethylene and ionomer used were tested for melt viscosities ($\eta_2$) and ($\eta_3$) at 280° C. and densities ($D_2$) and ($D_3$) at 25° C., respectively. The results are shown in Table 1 below.

(3) To the same twin-screw extruder ($\phi$=30 mm) as that used in the above (2), 100 parts by weight of the polyester resin chips obtained in the above (1) and 60 parts by weight of the blend chips obtained in the above (2) were fed, and mixed by melt kneading at 280° C. and extruded and cut, to yield chips of a polyester resin composition comprising the copolymerized polyethylene terephthalate having naphthalenedicarboxylic acid units, cobalt (II) acetate tetrahydrate, manganese (II) acetate tetrahydrate, linear low density polyethylene, ionomer, sodium acetate and phosphorus compound.

(4) The chips obtained in the above (3) were heated and dried at 90° C. for 16 hours and then formed into films for test in the same manner as in (4) of Example 1. These films were tested or evaluated for the properties in the same manner as in (4) of Example 1. The results are shown in Table 1 below.

Comparative Example 1

(1) A slurry was prepared from 76.2 parts by weight of ethylene glycol, 70.0 parts by weight of dimethyl terephthalate, 30.0 parts by weight of dimethyl isophthalate and 2,000 ppm of sodium acetate (561 ppm in terms of sodium atom) (diol component:dicarboxylic acid dimethyl ester=2.25:1 in moles). The slurry was, in the presence of 617 ppm of cobalt (II) acetate tetrahydrate (146 ppm in terms of cobalt atom) and 883 ppm of manganese (II) acetate tetrahydrate (198 ppm in terms of manganese atom), subjected to transesterification in the same manner as in (1) of Example 1, to yield a low-molecular-weight polymer composition containing cobalt (II) acetate tetrahydrate, manganese (II) acetate tetrahydrate and sodium acetate. The obtained low-molecular-weight polymer composition was then, in the presence of 200 ppm of a catalyst of germanium dioxide, melt polycondensed at a temperature of 280° C. under a reduced pressure of 1 torr (absolute pressure), to yield a polyester resin having an intrinsic viscosity of 0.70 dl/g. The polyester resin thus obtained was extruded through a nozzle into strands, which were then cut into cylindrical chips. The polyester resin was tested for melt viscosity ($\eta_1$) at 280° C. and density ($D_1$) at 25° C. The results are shown in Table 2 below.

(2) To the same twin-screw extruder ($\phi$=30 mm) as that used in the above (2), 100 parts by weight of the polyester resin chips obtained in the above (1) and 50 parts by weight of the same blend chips comprising the high density polyethylene and ethylene/acrylic acid copolymer as those obtained in (2) of Example 1 were fed. These, chips were mixed by melt kneading at 280° C. and extruded and cut, to yield chips of a polyester resin composition comprising the copolymerized polyethylene terephthalate resin having isophthalic acid units, cobalt (II) acetate tetrahydrate, manganese (II) acetate tetrahydrate, high density polyethylene, ethylene/acrylic acid copolymer and sodium acetate.

(3) The chips obtained in the above (2) were heated and dried at 60° C. for 16 hours and then formed into films for test in the same manner as in (4) of Example 1. These films were tested or evaluated for the properties in the same manner as in (4) of Example 1. The results are shown in Table 2 below.

Comparative Example 2

(1) A slurry was prepared from 62.3 parts by weight of ethylene glycol, 34.6 parts by weight of dimethyl terephthalate, 65.4 parts by weight of dimethyl 2,6-naphthalanedicarboxylate and 3,000 ppm of sodium acetate (841 ppm in terms of sodium atom) (diol component:dicarboxylic acid dimethyl ester=2.25:1 in moles). The slurry was, in the presence of 803 ppm of cobalt (II) acetate tetrahydrate (190 ppm in terms of cobalt atom), subjected to transesterification in the same manner as in (1) of Example 1, to yield a low-molecular-weight polymer composition containing cobalt (II) acetate tetrahydrate salt and sodium acetate. The obtained low-molecular-weight polymer composition was then, in the presence of 200 ppm of a catalyst of germanium dioxide, melt polycondensed at a temperature of 280° C. under a reduced pressure of 1 torr (absolute pressure), to yield a polyester resin having an intrinsic viscosity of 0.60 dl/g. The polyester resin thus obtained was extruded through a nozzle into strands, which were then cut into cylindrical chips. The polyester resin was tested for melt viscosity ($\eta_1$) at 280° C. and density ($D_1$) at 25° C. The results are shown in Table 2 below.

(2) Separately from the above (1), there were fed to the same twin-screw extruder ($\phi$=30 mm) as that used in (2) of Example 1, 100 parts by weight of the same low density polyethylene as that used in (2) of Example 2 and 10 parts by weight of the same ethylene/acrylic acid copolymer as that used in (2) of Example 1. These polymers were melt kneaded at 200° C. and extruded into strands, which were then cut to give blend chips comprising both of the polymers.

The low density polyethylene and ethylene/acrylic acid copolymer used were tested for melt viscosities ($\eta_2$) and ($\eta_3$) at 280° C. and densities ($D_2$) and ($D_3$) at 25° C., respectively. The results are shown in Table 2 below.

(3) To a twin-screw extruder ($\phi$=30 mm) similar to that used in the above (2), 100 parts by weight of the polyester resin chips obtained in the above (1) and 110 parts by weight of the blend chips obtained in the above (2) were fed. These chips were mixed by melt kneading at 280° C. and extruded and cut, to yield chips of a polyester resin composition comprising the copolymerized polyethylene terephthalate having naphthalenedicarboxylic acid units, cobalt (II) acetate tetrahydrate, low density polyethylene, ethylene/acrylic acid copolymer and sodium acetate.

(4) The chips obtained in the above (3) were heated and dried at 90° C. for 16 hours and then formed into films for test in the same manner as in (4) of Example 1. These films were tested or evaluated for the properties in the same manner as in (4) of Example 1. The results are shown in Table 2 below.

Comparative Example 3

(1) Example 2 was repeated except that the amount used of manganese (II) acetate tetrahydrate in (1) of Example 2 was changed to 250 ppm (56 ppm in terms of manganese atom), to produce a polyester resin. The polyester resin was tested for melt viscosity ($\eta_1$) at 280° C. and density ($D_1$) at 25° C. The results are shown in Table 2 below.

(2) To the same twin-screw extruder ($\phi$=30 mm) as that used in Example 1, 100 parts by weight of the polyester resin chips obtained in the above (1) and 40 parts by weight of the same blend chips as those obtained in (2) of Example 2 and comprising the low density polyethylene and the block copolymer comprising blocks of styrene/ethylene/butadiene copolymer modified with maleic anhydride and styrene polymer blocks were fed. These chips were mixed by melt kneading at 280° C. and extruded and cut, to yield chips of a polyester resin composition comprising the copolymerized polyethylene terephthalate resin having naphthalenedicarboxylic acid units, manganese (II) acetate tetrahydrate, low density polyethylene, above block copolymer and sodium acetate.

(3) The chips obtained in the above (2) were heated and dried at 90° C. for 16 hours and then formed into films for test in the same manner as in (4) of Example 1. These films were tested or evaluated for the properties in the same manner as in (4) of Example 1. The results are shown in Table 2 below.

TABLE 1

|  | Example 1 | Example 2 | Example 3 |
|---|---|---|---|
| [Polymer components in composition] |  |  |  |
| Polyester resin Copolymerization component (mole %) | NDCA 25 | NDCA 12.5 | NDCA 35 |
| Intrinsic viscosity (dl/g) | 0.75 | 0.68 | 0.55 |
| Melt viscosity ($\eta_1$) (poises) | 3660 | 2530 | 2010 |
| Density ($D_1$) | 1.33 | 1.33 | 1.33 |
| Amount of cobalt acetate added (in terms of cobalt atom) (ppm) | 191 | — | 124 |
| Amount of manganese acetate added (in terms of manganese atom) (ppm) | — | 258 | 142 |
| Trimethyl phosphate (in terms of phosphorous atom) (ppm) | — | — | 29 |
| $C_P/C_M$ | 0 | 0 | 0.2 |
| Sodium acetate (in terms of Na atom) (ppm) | — | 560 | 841 |
| Olefin polymer |  |  |  |
| Type | HDPE | LDPE | L-LDPE |
| Melt viscosity ($\eta_2$) (poises) | 5110 | 3290 | 4330 |
| Density ($D_2$) | 0.95 | 0.92 | 0.93 |

TABLE 1-continued

|  | Example 1 | Example 2 | Example 3 |
|---|---|---|---|
| Compatibility-improving agent |  |  |  |
| Type | EAA | MAN-SEBS | Ionomer |
| Melt viscosity ($\eta_3$) (poises) | 1110 | 5860 | 1250 |
| Density ($D_3$) | 0.94 | 0.92 | 0.96 |
| [Component of polyester resin composition] |  |  |  |
| Polyester resin (parts) | 100 | 100 | 100 |
| Olefin polymer (X) (parts) | 45 | 32 | 50 |
| Compatibility-improving agent (Y) (parts) | 5 | 8 | 10 |
| X + Y (parts) | 50 | 40 | 60 |
| X/Y | 9 | 4 | 5 |
| E {$\eta_1$(X + Y)/($\eta_2$X + $\eta_3$Y)} | 0.78 | 0.67 | 0.68 |
| F {$100 D_2 D_3/D_1(D_3 X + D_2 Y)$} | 1.42 | 1.73 | 1.13 |
| E/F | 0.55 | 0.39 | 0.60 |
| [Properties of film] |  |  |  |
| Flavor-barrier properties (%) | 97 | 99 | 98 |
| Amount of hydrogen peroxide eluted (ppm): |  |  |  |
| 75° C. | 0 | 0 | 0 |
| 90° C. | 0 | 0 | 0 |
| Lowest temperature for heatsealability (° C.) | 175 | 165 | 180 |
| Elongation (%) | 48 | 52 | 55 |

NDCA: 2,6-naphthalenedicarboxylic acid units
HDPE: high density polyethylene
LDPE: low density polyethylene
L-LDPE: linear low density polyethylene
EAA: ethylene/acrylic acid copolymer
Ionomer: ethylene/methacrylic acid copolymer crosslinked with metal ion
MAN-SEBS: block polymer comprising blocks of styrene/ethylene/butadiene copolymer modified with maleic anhydride and styrene blocks

TABLE 2

|  | Comp. Ex. 1 | Comp. Ex. 2 | Comp. Ex. 3 |
|---|---|---|---|
| [Polymer components in composition] |  |  |  |
| Polyester resin Copolymerization component (mole %) | IPA 15 | NDCA 30 | NDCA 12.5 |
| Intrinsic viscosity (dl/g) | 0.70 | 0.60 | 0.68 |
| Melt viscosity (n$\eta_1$) (poises) | 2250 | 2580 | 2530 |
| Density ($D_1$) | 1.33 | 1.33 | 1.33 |
| Amount of cobalt acetate added (in terms of cobalt atom) (ppm) | 146 | 190 | — |
| Amount of manganese acetate added (in terms of manganese atom) (ppm) | 198 | — | 56 |
| Trimethyl phosphate (in terms of phosphorous atom) (ppm) | — | — | — |
| $C_P/C_M$ | 0 | 0 | 0 |
| Sodium acetate (in terms of Na atom) (ppm) | 561 | 841 | 560 |
| Olefin polymer |  |  |  |
| Type | HDPE | LDPE | LDPE |
| Melt viscosity ($\eta_2$) | 5110 | 1120 | 3290 |

TABLE 2-continued

|  | Comp. Ex. 1 | Comp. Ex. 2 | Comp. Ex. 3 |
|---|---|---|---|
| (poises) |  |  |  |
| Density ($D_2$) | 0.95 | 0.92 | 0.92 |
| Compatibility-improving agent |  |  |  |
| Type | EAA | EAA | MAN-SEBS |
| Melt viscosity ($\eta_3$) | 1110 | 1110 | 5860 |
| (poises) |  |  |  |
| Density ($D_3$) | 0.94 | 0.94 | 0.92 |
| [Components of polyester resin composition] |  |  |  |
| Polyester resin (parts) | 100 | 100 | 100 |
| Olefin polymer (X) (parts) | 45 | 100 | 32 |
| Compatibility-improving agent (Y) (parts) | 5 | 10 | 8 |
| X + Y (parts) | 50 | 110 | 40 |
| X/Y | 9 | 10 | 4 |
| E {$\eta_1$(X + Y)/($\eta_2$X + $\eta_3$Y)} | 0.48 | 2.30 | 0.67 |
| F {$100 D_2 D_3/D_1 (D_3 X + D_2 Y)$} | 1.42 | 0.63 | 1.73 |
| E/F | 0.33 | 3.65 | 0.39 |
| [Properties of film] |  |  |  |
| Flavor-barrier properties (%) | 98 | 43 | 99 |
| Amount of hydrogen peroxide eluted (ppm): |  |  |  |
| 75° C. | 2 | 0 | 0 |
| 90° C. | 5 | 0 | 2 |
| Lowest temperature for heatsealability (° C.) | 170 | 130 | 165 |
| Elongation (%) | 52 | 55 | 52 |

IPA: isophthalic acid units
NDCA: 2,6-naphthalenedicarboxylic acid units
HDPE: high density polyethylene
LDPE: low density polyethylene
EAA: ethylene/acrylic acid copolymer
Ionomer: ethylene/methacrylic acid copolymer crosslinked with metal ion
MAN-SEBS: block copolymer comprising blocks of styrene/ethylene/butadiene copolymer modified with maleic anhydride and styrene blocks It is understood from the results shown in Table 1 and Table 2, that the films obtained from the polyester resin compositions obtained in Examples 1 through 3, each of which comprises copolymerized polyethylene terephthalate comprising 5 to 40 mole % of naphthalenedicarboxylic acid units, 100 to 1000 ppm in terms of metal atom based on the copolyethylene terephthalate of at least one metal compound selected from the group consisting of cobalt compounds and manganese compounds, and an olefin polymer and a compatibility-improving agent in amounts such as to satisfy the above formulas ① and ② and, at the same time, has been obtained by melt kneading such that the above formula ③ is satisfied, are excellent in resistance to hydrogen peroxide and do not swell (absorb hydrogen peroxide into the film) when immersed in an aqueous hydrogen peroxide solution at 75° C. or 90° C., thus causing no elution of the hydrogen peroxide into distilled water, and are hence excellent in safety.

Furthermore, with the films obtained in Examples 1 through 3, limonene, which is a flavor component of orange juice, remained, without being adsorbed or absorbed in the films, in orange juice and keeps the flavor of orange juice at a good level over a long period of time, which proves excellent flavor-barrier properties of the films. The films also have an appropriate elongation and heatsealable temperature, thereby showing excellent handleability and heatsealability.

On the other hand, it is understood from the results of Comparative Example 1 shown in Table 2, that the polyester resin composition of Comparative Example 1, comprising a polyester resin of a copolymerized polyethylene terephthalate containing isophthalic acid units instead of 2,6-naphthalenedicarboxylic acid units, is, although the polyester resin contains a cobalt compound and manganese compound in an amount of 100 to 1000 ppm in terms of metal atom, and an olefin polymer and a compatibility-improving agent in such amounts as to satisfy the above formulas ① and ②, and has been obtained by melt kneading such that the above formula ③ is satisfied, is inferior in resistance to hydrogen peroxide and, when immersed in an aqueous hydrogen peroxide solution at 75° C. or 90° C., swells (absorbs hydrogen peroxide into the film) to a large extent, thus causing elution into distilled water to some degree.

It is also understood from the results of Comparative Example 2 in Table 2, that with the film obtained from the polyester resin composition of Comparative Example 2, in which the total content of an olefin polymer and compatibility-improving agent deviates above the range of the above formula ① and the value of E/F in the formula ③ is larger than 1, thus deviating the range specified in the present invention, the amount of limonene remaining in orange juice markedly decreases, which means the limonene in orange juice has been adsorbed and/or absorbed in the film, so that the film is markedly poor in flavor-barrier properties.

It is further understood from the results of Comparative Example 3 in Table 2, that the film obtained from the polyester resin composition of Comparative Example 3, which does contain a metal compound (manganese compound) but in an amount of 56 ppm in terms of manganese atom, i.e. in an amount smaller than the range of 100 to 1000 ppm specified in the present invention, is poorer in resistance to hydrogen peroxide compared to the films obtained from the polyester resin compositions of Examples 1 through 3, and, although showing no swelling (absorption of hydrogen peroxide into the film) when immersed in an aqueous hydrogen peroxide solution, swells (absorbs hydrogen peroxide into the film) when immersed in the aqueous hydrogen peroxide solution at 90° C.

Example 4

(1) A slurry was prepared from 62.3 parts by weight of ethylene glycol, 44.3 parts by weight of dimethyl terephthalate and 55.7 parts by weight of dimethyl 2,6-naphthalenedicarboxylate (diol component:dicarboxylic acid component=2.25:1 in moles). The slurry was, in the presence of 803 ppm of cobalt (II) acetate tetrahydrate (190 ppm in terms of cobalt atom) and 901 ppm of manganese (II) acetate tetrahydrate (202 ppm in terms of manganese atom) subjected to transesterification by gradually heating from 170° C. up to 220° C. over 2 hours and 30 minutes, to yield a low-molecular-weight polymer composition containing cobalt (II) acetate tetrahydrate and manganese (II) acetate tetrahydrate.

(2) The low-molecular-weight polymer composition obtained in the above (1) and containing cobalt (II) acetate tetrahydrate and manganese (II) acetate tetrahydrate was then, in the presence of 200 ppm of a catalyst of germanium dioxide, melt polycondensed at a temperature of 280° C.

under a reduced pressure of 1 torr (absolute pressure), to yield a polyester resin having an intrinsic viscosity of 0.68 dl/g. The polyester resin thus obtained was extruded through a nozzle into strands, which were then cut into cylindrical chips.

(3) The chips obtained in the above (2) were heated and vacuum-dried at 60° C. for 16 hours and then, in accordance with the above-described testing methods, formed into films having a thickness of 100 μm and 500 μm, which were tested or evaluated for the swellability with hydrogen peroxide, flavor-barrier properties, heatsealability and elongation, by the above methods. The results are shown in Table 3 below.

Example 5

(1) The procedures of (1) and (2) of Example 4 were followed except that in (2) of Example 4 melt polycondensation of the low-molecular-weight polymer composition containing cobalt (II) acetate tetrahydrate and manganese (II) acetate tetrahydrate was conducted in the presence of 200 ppm of germanium dioxide and 289 ppm of trimethyl phosphate (64 ppm in terms of phosphorous atom), to produce chips of a polyester resin.

(2) The chips obtained in the above (1) were heated and vacuum-dried at 60° C. for 16 hours and then, in the same manner as in (3) of Example 4, formed into films, which were further shaped into films for test in the same manner as in (3) of Example 4. These films were tested or evaluated for various properties in the same manner as in (4) of Example 1. The results are shown in Table 3 below.

Example 6

(1) A slurry was prepared from 68.3 parts by weight of ethylene glycol, 71.3 parts by weight of dimethyl terephthalate and 29.8 parts by weight of dimethyl 2,6-naphthalanedicarboxylate (diol component:dicarboxylic acid component=2.25:1 in moles). The slurry was, in the presence of 486 ppm of cobalt (II) acetate tetrahydrate (115 ppm in terms of cobalt atom) and 357 ppm of manganese (II) acetate tetrahydrate (80 ppm in terms of manganese atom) subjected to transesterification by gradually heating from 170° C. up to 220° C. over 2 hours and 30 minutes, to yield a low-molecular-weight polymer composition containing cobalt (II) acetate tetrahydrate and manganese (II) acetate tetrahydrate.

(2) The low-molecular-weight polymer composition obtained in the above (1) and containing cobalt (II) acetate tetrahydrate and manganese (II) acetate tetrahydrate was then, in the presence of 200 ppm of a catalyst of germanium dioxide, melt polycondensed at a temperature of 280° C. under a reduced pressure of 1 torr (absolute pressure), to yield a polyester resin having an intrinsic viscosity of 0.78 dl/g. The polyester resin thus obtained was extruded through a nozzle into strands, which were then cut into cylindrical chips.

(3) The chips obtained in the above (2) were heated and vacuum-dried at 60° C. for 16 hours and, in the same manner as in (3) of Example 4, formed into films, which were, in the same manner as in (3) of Example 4, further shaped into films for test. The obtained films were tested or evaluated for various properties in the same manner as in (4) of Example 1. The results are shown in Table 3 below.

Example 7

(1) The procedure of (1) of Example 6 were followed except that, on production of the low-molecular-weight polymer composition, 2000 ppm of sodium acetate (560 ppm in terms of sodium atom) was further used, to produce a low-molecular-weight polymer composition containing cobalt (II) acetate tetrahydrate, manganese (II) acetate tetrahydrate and sodium acetate.

(2) The low-molecular-weight polymer composition obtained in the above (1) was melt polycondensed in the same manner as in (2) of Example 6, to yield a polyester resin having an intrinsic viscosity of 0.78 dl/g. The polyester resin thus obtained was extruded through a nozzle into strands, which were then cut into cylindrical chips.

(3) The chips obtained in the above (2) were heated and vacuum-dried at 60° C. for 16 hours and, in the same manner as in (3) of Example 4, formed into films, which were, in the same manner as in (3) of Example 4, further shaped into films for test. The obtained films were tested or evaluated for various properties in the same manner as in (4) of Example 1. The results are shown in Table 3 below.

Example 8

(1) A slurry was prepared from 62.3 parts by weight of ethylene glycol, 34.6 parts by weight of dimethyl terephthalate and 65.4 parts by weight of dimethyl 2,6-naphthalanedicarboxylate (diol component:dicarboxylic acid component=2.25:1 in moles). The slurry was, in the presence of 562 ppm of cobalt (II) acetate tetrahydrate (133 ppm in terms of cobalt atom) and 1102 ppm of manganese (II) acetate tetrahydrate (247 ppm in terms of manganese atom) subjected to transesterification by gradually heating from 170° C. up to 220° C. over 2 hours and 30 minutes, to yield a low-molecular-weight polymer composition containing cobalt (II) acetate tetrahydrate and manganese (II) acetate tetrahydrate.

(2) The low-molecular-weight polymer composition obtained in the above (1) and containing cobalt (II) acetate tetrahydrate and manganese (II) acetate tetrahydrate was then, in the presence of 200 ppm of germanium dioxide and 190 ppm of trimethyl phosphate (42 ppm in terms of phosphorous atom), melt polycondensed at a temperature of 280° C. under a reduced pressure of 1 torr (absolute pressure) , to yield a polyester resin having an intrinsic viscosity of 0.64 dl/g. The polyester resin thus obtained was extruded through a nozzle into strands, which were then cut into cylindrical chips.

(3) The chips obtained in the above (2) were heated and vacuum-dried at 60° C. for 16 hours and, in the same manner as in (3) of Example 4, formed into films, which were, in the same manner as in (3) of Example 4, further shaped into films for test. The obtained films were tested or evaluated for various properties in the same manner as in (4) of Example 1. The results are shown in Table 3 below.

Comparative Example 4

(1) A slurry was prepared from 57.2 parts by weight of ethylene glycol and 100 parts by weight of dimethyl 2,6-naphthalanedicarboxylate (diol component:dicarboxylic acid component=2.25:1 in moles). The slurry was, in the presence of 250 ppm of manganese (II) acetate tetrahydrate (56 ppm in terms of manganese atom), subjected to transesterification by gradually heating from 170° C. up to 220° C. over 2 hours and 30 minutes, to yield a low-molecular-weight polymer composition containing manganese (II) acetate tetrahydrate.

(2) The low-molecular-weight polymer composition obtained in the above (1) and containing manganese (II)

acetate terahydrate was then, in the presence of 200 ppm of germanium dioxide, melt polycondensed at a temperature of 280° C. under a reduced pressure of 1 torr (absolute pressure), to yield a polyester resin having an intrinsic viscosity of 0.51 dl/g. The polyester resin thus obtained was extruded through a nozzle into strands, which were then cut into cylindrical chips.

(3) The chips obtained in the above (2) were heated and vacuum-dried at 60° C. for 16 hours and, in the same manner as in (3) of Example 4, formed into films, which were, in the same manner as in (3) of Example 4, further shaped into films for test. The obtained films were tested or evaluated for various properties in the same manner as in (4) of Example 1. The results are shown in Table 4 below.

yield a polyester resin having an intrinsic viscosity of 0.81 dl/g. The polyester resin thus obtained was extruded through a nozzle into strands, which were then cut into cylindrical chips.

(3) The chips obtained in the above (2) were heated and vacuum-dried at 60° C. for 16 hours and, in the same manner as in (3) of Example 4, formed into films, which were, in the same manner as in (3) of Example 4, further shaped into films for test. The obtained films were tested or evaluated for various properties in the same manner as in (4) of Example 1. The results are shown in Table 4 below.

TABLE 3

| | Example 4 | Example 5 | Example 6 | Example 7 | Example 8 |
|---|---|---|---|---|---|
| [Prescription for producing polyester resin] | | | | | |
| Copolymerization component (mole %) | NDCA 25 | NDCA 25 | NDCA 12.5 | NDCA 12.5 | NDCA 30 |
| Intrinsic viscosity (dl/g) | 0.68 | 0.68 | 0.78 | 0.78 | 0.64 |
| Amount of cobalt acetate added (in terms of Co atom) (ppm) | 190 | 190 | 115 | 115 | 133 |
| Amount of manganese acetate added (in terms of Mn atom) (ppm) | 202 | 202 | 80 | 80 | 247 |
| Trimethyl phosphate (in terms of phosphorous atom) (ppm) | — | 64 | — | — | 42 |
| Sodium acetate (in terms of Na atom) (ppm) | — | — | — | 560 | — |
| [Polyester resin composition] | | | | | |
| $C_{Co}$ (mole %) | 0.07 | 0.07 | 0.04 | 0.04 | 0.05 |
| $C_{Mn}$ (mole %) | 0.08 | 0.08 | 0.03 | 0.03 | 0.10 |
| $C_{Co} + C_{Mn}$ (mole %) | 0.15 | 0.15 | 0.07 | 0.07 | 0.15 |
| $C_P/(C_{Co} + C_{Mn})$ | 0 | 0.3 | 0 | 0 | 0.2 |
| [Properties of film] | | | | | |
| Flavor-barrier properties (%) | 98 | 98 | 95 | 95 | 98 |
| Amount of hydrogen peroxide eluted (ppm): | | | | | |
| 75° C. | 0 | 0 | 0 | 0 | 0 |
| 90° C. | 0.5 | 0.5 | 1 | 0.5 | 1 |
| Lowest temperature (° C.) for heatsealability | 175 | 175 | 165 | 165 | 180 |
| Elongation (%) | 57 | 72 | 69 | 68 | 64 |

NDCA: 2,6-naphthalenedicarboxylic acid units

Comparative Example 5

(1) A slurry was prepared from 62.3 parts by weight of ethylene glycol, 22.3 parts by weight of 1,4-cyclohexanedimethanol and 100 parts by weight of dimethyl terephthalate (diol component:dicarboxylic acid component=2.25:1 in moles). The slurry was, in the presence of 803 ppm of cobalt (II) acetate tetrahydrate (190 ppm in terms of cobalt atom) 901 ppm of manganese (II) acetate tetrahydrate (202 ppm in terms of manganese atom), subjected to transesterification by gradually heating from 170° C. up to 220° C. over 2 hours and 30 minutes, to yield a low-molecular-weight polymer composition containing cobalt (II) acetate tetrahydrate and manganese (II) acetate tetrahydrate.

(2) The low-molecular-weight polymer composition obtained in the above (1) and containing cobalt (II) acetate tetrahydrate and manganese (II) acetate tetrahydrate was then, in the presence of 200 ppm of germanium dioxide and 50 ppm of trimethyl phosphate (11 ppm in terms of phosphorous atom), melt polycondensed at a temperature of 280° C. under a reduced pressure of 1 torr (absolute pressure), to

TABLE 4

| | Comparative Example 4 | Comparative Example 5 |
|---|---|---|
| [Prescription for producing polyester resin] | | |
| Copolymerization component (mole %) | NDCA 50 | CHDM 15 |
| Intrinsic viscosity (dl/g) | 0.51 | 0.81 |
| Amount of cobalt acetate added (in terms of Co atom) (ppm) | — | 190 |
| Amount of manganese acetate added (in terms of Mn atom) (ppm) | 56 | 202 |
| Trimethyl phosphate (in terms of phosphorous atom) (ppm) | — | 11 |
| Sodium acetate (in terms of Na atom) (ppm) | — | — |
| [Polyester resin composition (content of additive)] | | |
| $C_{Co}$ (mole %) | 0 | 0.07 |
| $C_{Mn}$ (mole %) | 0.02 | 0.08 |
| $C_{Co} + C_{Mn}$ (mole %) | 0.02 | 0.15 |
| $C_P/(C_{Co} + C_{Mn})$ | 0 | 0.05 |

TABLE 4-continued

|  | Comparative Example 4 | Comparative Example 5 |
|---|---|---|
| [Properties of film] | | |
| Flavor-barrier properties (%) | 99 | 83 |
| Amount of hydrogen peroxide eluted (ppm): | | |
| 75° C. | 2 | 5 |
| 90° C. | 2 | 10 |
| Lowest temperature for (° C.) heatsealability | not-heat-sealable | 90 |
| Elongation (%) | 40 | 80 |

NDCA: 2,6-naphthalenedicarboxylic acid units
CHDM: 1,4-cyclohexanedimethanol units It is understood from the results shown in Table 3 and Table 4, that the films obtained from the polyester resin compositions obtained in Examples 4 through 8, each of which comprises copolymerized polyethylene terephthalate containing 5 to 40 mole % of naphthalenedicarboxylic acid units, and a cobalt compound and manganese compound in amounts such as to satisfy the above formulas ⑤ through ⑦ are excellent in resistance to hydrogen peroxide and does not swell (absorb of hydrogen peroxide into the film) when immersed in an aqueous hydrogen peroxide solution at 75° C. or 90° C. or swells to a minimum extent, thus proving to be excellent in safety. Furthermore, with the films obtained in Examples 4 through 8, limonene, which is a flavor component of orange juice, remains, without being adsorbed or absorbed in the films, in orange juice and keeps the flavor of orange juice at a good level over a long period of time, which proves excellent flavor-barrier properties of the films. The films also have an appropriate elongation and heatsealable temperature, thus showing excellent handleability and heatsealability.

It is also understood from the results of Example 4 and Example 5 in Table 3 above, that in Example 5, where a phosphorous compound is, together with a cobalt compound and manganese compound, contained in an amount as to satisfy the above formula ④, the obtained film has a larger elongation, thus proving to be still better in mechanical properties.

It is further understood from the results of Example 6 and Example 7 in Table 3 above, that in Example 7, where an alkali metal salt of an organic carboxylic acid is, together with a cobalt compound and manganese compound, contained, the obtained film has still better resistance to hydrogen peroxide.

On the other hand, it is understood from the results of Comparative Example 4 shown in Table 4 above, that the polyester resin composition, obtained by adding only a manganese compound to a copolymerized polyethylene terephthalate containing 2,6-naphthalenedicarboxylic acid units, is inferior in resistance to hydrogen peroxide and, when immersed in an aqueous hydrogen peroxide solution at 75° C. or 90° C., swells (absorbs hydrogen peroxide into the film) to a large extent, thus causing elution of the hydrogen peroxide into distilled water, and, besides, has low elongation.

It is also understood from the results of Comparative Example 5, that the polyester resin composition comprising a polyester resin containing 1,4-cyclohexanedimethanol units instead of 2,6-naphthalenedicarboxylic acid units is markedly poor in resistance to hydrogen peroxide and, when immersed in an aqueous hydrogen peroxide solution, swells (absorbs hydrogen peroxide into the film) to a large extent, and that the composition is also poor in flavor-barrier properties.

Example 9

(1) The chips of the polyester resin composition obtained in (3) of Example 1 was melt extruded at a temperature of 280° C. into a film having a thickness of 20 μm, which was extrusion laminated on a paper base (thickness: 200 μm) for paper container, to yield a laminate. A paper container for juice (capacity: 200 ml) was produced by the usual container shaping process (folding and heatsealing; heatsealing temperature: 190° C.) with use of the obtained laminate in such a manner that the layer of the polyester resin composition film was positioned on the inner surface of the container.

(2) The paper container obtained in (1) above was filled with a 35% aqueous hydrogen peroxide solution at a temperature of 75° C. and kept standing for 30 seconds, so that sterilization was effected. The aqueous hydrogen peroxide solution was removed from the paper container, which was then washed 3 times with purified water (200 ml of purified water per washing).

(3) The paper container obtained in (2) above was filled with previously sterilized orange juice (180 ml/container) and sealed.

(4) The paper container with orange juice obtained in (3) above was kept at room temperature for 1 month. Thereafter, the container was opened and the contents tasted. The juice showed good flavor and taste.

Example 10

(1) Example 9 was repeated except that the chips obtained in (2) of Example 4 was used as the polyester resin composition, to produce a laminate comprising a paper base and a layer of the polyester resin composition film, to produce a laminate. A paper container for juice (capacity: 200 ml) was produced from the obtained laminate in the same manner as in Example 9.

(2) The paper container obtained in (1) above was filled with previously sterilized orange juice (180 ml/container) and sealed. The paper container with orange juice was kept at room temperature for 1 month. Thereafter, the container was opened and the contents tasted. The juice showed good flavor and taste.

INDUSTRIAL APPLICABILITY

The polyester resin compositions and films and like articles obtained therefrom of the present invention are excellent in resistance to hydrogen peroxide and do not cause, when treated with hydrogen peroxide, swelling, bubble generation, delamination from base material and like troubles. Consequently, the polyester resin compositions and films and like articles obtained therefrom of the present invention do not cause, when used as packaging materials or containers directly touching the food contained therein and sterilized with hydrogen peroxide, the hydrogen peroxide to dissolve out into the food after the sterilization, thus being excellent in safety and, besides, show excellent processability and handleability on production of food containers and like items.

The polyester resin compositions and films and like articles obtained therefrom of the present invention are also excellent in flavor-barrier properties and gas-barrier properties and hence can be effectively used in a wide variety of fields such as packaging materials for foods.

The polyester resin compositions and films and like articles obtained therefrom of the present invention are also excellent in heatsealability and mechanical properties such as elongation and strength, thus having excellent handleability and durability.

What is claimed is:

1. A polyester resin composition
   (i) which comprises:
      (a) units from a diol consisting essentially of ethylene glycol units and units from a dicarboxylic acid consisting essentially of terephthalic acid, as essential components, and units from naphthalenedicarboxylic acid in an amount of 5 to 40 mole % based on the total moles of all structural units;
      (b) at least one metal compound selected from the group consisting of cobalt compounds and manganese compounds;
      (c) an olefin polymer; and
      (d) a compatibility-improving agent;
   (ii) said metal compound being contained in an amount based on the weight of said polyester resin of 100 to 1,000 ppm and said olefin polymer and compatibility-improving agent being contained in such amounts as to satisfy the following formulas ① and ②:

$$10 \text{ (parts by weight)} \leq X+Y \leq 100 \text{ (parts by weight)} \quad ①$$

$$1 \leq X/Y \leq 90 \quad ②$$

wherein X and Y represent, respectively, the content of the olefin polymer (parts by weight) based on 100 parts by weight of the polyester resin and that of the compatibility-improving agent on the same basis; and
   (iii) which has been obtained by melt kneading in such a manner as to satisfy the following formula ③

$$E/F \leq 1 \quad ③$$

where $E=\eta_1(X+Y)/(\eta_2 X+\eta_3 Y)$ $F=100 D_2 D_3/D_1(D_3 X+D_2 Y)$ wherein X and Y are the same as defined for formulas ① and ②, $\eta_2$ and $\eta_3$ represent, respectively, the melt viscosities (in poises) of the polyester resin, olefin polymer and compatibility-improving agent, determined at the melt kneading temperature on preparation of the polyester resin composition, and $D_1$, $D_2$ and $D_3$ represent, respectively, the densities at 25° C. of the polyester resin, olefin polymer and compatibility-improving agent.

2. The polyester resin composition according to claim 1, further comprising an alkali metal salt of an aliphatic carboxylic acid having 1 to 15 carbon atoms in an amount of 100 to 10,000 ppm based on the weight of the polyester resin.

3. The polyester resin composition according to claim 1, further comprising a phosphorus compound in such an amount as to satisfy the following formula ④

$$(C_P/C_M) \leq 0.65 \quad ④$$

wherein $C_P$ and $C_M$ represent, respectively, the mole % based on the total moles of dicarboxylic acid units contained in the polyester resin of the phosphorus compound in terms of phosphorus atom and that of the metal compound in terms of the metal atom.

4. The polyester resin composition according to claim 1, wherein said compatibility-improving agent is one or at least two polymer selected from the group consisting of ethylene/(meth)acrylic acid copolymers; ethylene/(meth)-acrylic acid copolymers crosslinked with a metal ion; block copolymers comprising blocks of a styrene/ethylene/butadiene copolymer having carboxyl group or derivatives thereof and styrene polymer blocks; and block copolymers comprising blocks of an olefin polymer having carboxyl group or derivatives thereof and styrene polymer blocks.

5. A polyester resin composition
   (i) which comprises:
      (a) units from a diol consisting essentially of ethylene glycol and units from a dicarboxylic acid consisting essentially of terephthalic acid, as essential components, and units from naphthalenedicarboxylic acid in an amount of 5 to 40 mole % based on the total moles of all structural units;
      (b) a cobalt compound; and
      (c) a manganese compound
   (ii) said cobalt compound and manganese compound being contained in such amounts as to satisfy the following formulas ⑤ through ⑦:

$$0.02 \leq C_{Co} \leq 0.20 \quad ⑤$$

$$0.01 \leq C_{Mn} \leq 0.20 \quad ⑥$$

$$0.03 \leq (C_{Co}+C_{Mn}) \leq 0.30 \quad ⑦$$

wherein $C_{Co}$ and $C_{Mn}$ represent, respectively, the mole % based on the total moles of all dicarboxylic acid units present in the polyester resin of the cobalt compound in terms of cobalt atom and that of manganese compound in terms of manganese atom.

6. The polyester resin composition according to claim 5, further comprising an alkali metal salt of an aliphatic carboxylic acid having 1 to 15 carbon atoms in an amount of 100 to 10,000 ppm in terms of the alkali metal atom based on the weight of the polyester resin.

7. The polyester resin composition according to claim 5, further comprising a phosphorus compound in such an amount as to satisfy the following formula ④

$$C_P/(C_{Co}+C_{Mn}) \leq 0.65 \quad ④$$

wherein $C_P$, $C_{Co}$ and $C_{Mn}$ represent, respectively, the mole % based on the total moles of dicarboxylic acid units contained in the polyester resin of the phosphorus compound in terms of phosphorus atom, that of the cobalt compound in terms of cobalt atom and that of the manganese compound in terms of manganese atom.

8. A shaped article comprising the polyester resin composition according to claim 1.

9. A film comprising the polyester resin composition according to claim 1.

10. A film for food comprising the polyester resin composition according to claim 1.

11. A packaging material comprising the polyester resin composition according to claim 1.

12. A laminate comprising a layer of the polyester resin composition according to claim 1 and a paper layer.

13. A paper container covered on the inner surface thereof with the polyester resin composition according to claim 1.

14. A shaped article comprising the polyester resin composition according to claim 5.

15. A film comprising the polyester resin composition according to claim 5.

16. A film for food comprising the polyester resin composition according to claim 5.

17. A packaging material comprising the polyester resin composition according to claim 5.

18. A laminate comprising a layer of the polyester resin composition according to claim 5 and a paper layer.

19. A ployester resin composition
   (i) which comprises
      (a) units from a diol consisting essentially of ethylene glycol and units fro, a dicarboxylic acid consisting essentially of terephthalic acid, as essential components, and units from naphthalenedicarboxylic acid in an amount of 5 to 40 mole % based on the total moles of all structural units;
      (b) a cobalt compound; and
      (c) a manganese compound
   (ii) said cobalt compound and manganese compound being contained in such amounts as to satisify the following formulas ⑤ through ⑦:

$$0.01 \leq C_{Co} \leq 0.20 \quad \text{⑤}$$
   $$0.01 \leq C_{Mn} \leq 0.20 \quad \text{⑥}$$
   $$0.02 \leq (C_{Co}+C_{Mn}) \leq 0.30 \quad \text{⑦}$$

and
      (d) a phosphorus compound in such an amount as to satisfy the following formula ④'

$$C_p / (C_{Co}+C_{Mn}) \leq 0.65 \quad \text{④'}$$

wherein
   $C_p$, $C_{Co}$ and $C_{Mn}$ represent, respectively, the mole % based on the total moles of dicarboxylic acid units contained in the polyester resin of the phosphorus compound in terms of phosphorus atom, that of the cobalt compound in terms of cobalt atom and that of the manganese compound in terms of manganese atom.

20. A shaped article, comprising the polyester resin composition according to claim 19.

21. A film, comprising the polyester resin composition according to claim 19.

22. A film for food, comprising the polyester resin composition according to claim 19.

23. A packaging material, comprising the polyester resin composition according to claim 19.

24. A laminate, comprising a layer of the polyester resin composition according to claim 19 and a paper layer.

25. A polyester resin composition
   (i) which comprises
      (a) units from a diol consisting essentially of ethylene glycol and units from a dicarboxylic acid consisting of terephthalic acid, as essential components, and units from naphthalenedicarboxylic acid in an amount of 5 to 40 mole % based on the total moles of all structural units;
      (b) a cobalt compound; and
      (c) a manganese compound
   (ii) said cobalt compound and manganese compound being contained in such amounts as to satisfy the following formulas ⑤ through ⑦:

$$0.01 \leq C_{Co} \leq 0.20 \quad \text{⑤}$$
   $$0.01 \leq C_{Mn} \leq 0.20 \quad \text{⑥}$$
   $$0.04 \leq (C_{Co}+C_{Mn}) \leq 0.30 \quad \text{⑦}$$

wherein $C_{Co}$ and $C_{Mn}$ represent, respectively, the mole % based on the total moles of all dicarboxylic acid units present in the polyester resin of the cobalt compound in terms of cobalt atom and that of manganese compound in terms of manganese atom.

26. The polyester resin composition of claim 25, further comprising a phosphorus compound in such an amount as to satisfy the following formula ④'

$$C_p, (C_{Co}+C_{Mn}) \leq 0.65 \quad \text{④'}$$

wherein
   $C_p$, $C_{Co}$ and $C_{Mn}$ represent, respectively, the mole % based on the total moles of dicarboxylic acid units contained in the polyester resin of the phosphorus compound in terms of phosphorus atom, that of the cobalt compound in terms of cobalt atom and that of the manganses compound in terms of manganese atom.

27. The polyester resin composition according to claim 25, further comprising an alkali metal salt of an aliphatic carboxylic acid having 1 to 15 carbon atoms in an amount of 100 to 10,000 ppm in terms of the alkali metal atom based on the weight of the polyester resin.

28. A shaped article, comprising the polyester resin composition according to claim 25.

29. A film, comprising the polyester resin composition according to claim 25.

30. A film for food, comprising the polyester resin composition according to claim 25.

31. A packaging material, comprising the polyester resin composition according to claim 25.

32. A laminate, comprising a layer of polyester resin composition according to claim 25 and a paper layer.

* * * * *